(12) United States Patent
Elewitz et al.

(10) Patent No.: US 11,676,048 B2
(45) Date of Patent: Jun. 13, 2023

(54) SYSTEMS AND METHODS FOR VALIDATION OF ARTIFICIAL INTELLIGENCE MODELS

(71) Applicant: Pearson Education, Inc., Bloomington, MN (US)

(72) Inventors: Zachary S. Elewitz, Denver, CO (US); Daniel L. Ensign, Fort Lupton, CO (US)

(73) Assignee: PEARSON EDUCATION, INC., Bloomington, MN (US)

( * ) Notice: Subject to any disclaimer, the term of this patent is extended or adjusted under 35 U.S.C. 154(b) by 748 days.

(21) Appl. No.: 16/671,869

(22) Filed: Nov. 1, 2019

(65) Prior Publication Data
US 2021/0133600 A1 May 6, 2021

(51) Int. Cl.
*G06N 5/04* (2023.01)
*G06N 20/00* (2019.01)
*G06F 17/17* (2006.01)

(52) U.S. Cl.
CPC ............ *G06N 5/04* (2013.01); *G06N 20/00* (2019.01); *G06F 17/17* (2013.01)

(58) Field of Classification Search
CPC ............ G06N 5/04; G06N 20/00; G06N 3/08; G06N 20/20; G06F 17/17
USPC ........................................................ 706/102
See application file for complete search history.

(56) References Cited

U.S. PATENT DOCUMENTS

| | | | |
|---|---|---|---|
| 2015/0193699 A1* | 7/2015 | Kil | G06N 5/022 706/12 |
| 2016/0314255 A1* | 10/2016 | Cook | G06F 16/906 |
| 2020/0051451 A1* | 2/2020 | Goyal | G06N 3/08 |
| 2020/0111378 A1* | 4/2020 | Essafi | G06F 30/20 |
| 2020/0302296 A1* | 9/2020 | Miller | G06N 20/20 |

OTHER PUBLICATIONS

Pang et al., "Predicting Students' Graduation Outcomes through Support Vector Machines", IEEE, pp. 1-8. (Year: 2017).*

* cited by examiner

*Primary Examiner* — Kenneth Tang
(74) *Attorney, Agent, or Firm* — Quarles & Brady LLP

(57) ABSTRACT

Systems and methods are described which relate to machine learning model validation. A first machine learning model may be trained to dependent variable data for a first population. A second machine learning model may be trained to simulate dependent variable data for the first population. The second machine learning model may then be applied to student activity data of a second population having different characteristics from the first population to produce simulated dependent variable data. The first machine learning model may then generate predictions for the second population, which may be validated via comparison to the simulated dependent variable data. A given simulated dependent variable value may be generated by the second machine learning model at a specific time $T_X$, where some features input to the machine learning model may be derived from datapoints occurring before $T_X$ and others being derived from datapoints occurring after $T_X$.

20 Claims, 7 Drawing Sheets

SYSTEMS AND METHODS FOR VALIDATION OF ARTIFICIAL INTELLIGENCE MODELS

FIELD OF THE INVENTION

This disclosure relates to the field of systems and methods related to the validation of artificial intelligence (AI) models and, as a specific example, to the validation of machine learning models to make predictions for populations possessing different characteristics than populations on which the machine learning models were originally trained.

BACKGROUND

A computer network or data network is a telecommunications network which allows computers to exchange data. In computer networks, networked computing devices exchange data with each other along network links (data connections). The connections between nodes are established using either cable media or wireless media.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on other more specific or more general communications protocols, except for the physical layer that directly deals with the transmission media.

Supervised machine learning models typically use a collection of input information in order predict the value or category of a dependent variable. There are times when it can be advantageous to apply a model designed/trained for use in one set of circumstances to a different environment. If this new environment contains the same types of input information but lacks sufficient dependent variable information, the model can be applied but the model's efficacy in the new environment cannot be evaluated by conventional methods. Without evaluating the model's efficacy, it cannot be determined whether the model accomplishes its designed purpose in this new environment.

SUMMARY OF THE INVENTION

In an example embodiment, a system may include a feature data store, a model data store, an electronic communication network, a model server, and a resource management server. The model server may be coupled to the model data store and the feature data store via the electronic communication network. The feature data store may include a first memory device configured to store a first set of feature vectors corresponding to a first subset of students of a second population of students having second characteristics and a second set of feature vectors corresponding to a second subset of students of the second population of students. The model data store may include a second memory device configured to store a first definition for a first machine learning model and a second definition for a second machine learning model. The model server may include a third memory device and a first processor. The third memory device may be configured to store first computer-readable instructions. The first processor may be configured to execute the first computer-readable instructions to execute the first machine learning model to process the first set of feature vectors to generate a set of risk predictions. The first machine learning model may be trained to predict risk for a first population of students having first characteristics. The first processor may be further configured to execute the second machine learning model to process the second set of feature vectors to generate a set of simulated test data. The second machine learning model may be trained to simulate test data for the first population of students. The resource management server may include a fourth memory device and a second processor. The fourth memory device may be configured to store second computer-readable instructions. The second processor may be configured to execute the second computer-readable instructions to determine, based on the set of simulated test data and the set of risk predictions, that the first machine learning model is valid for predicting risk for the second population.

In some embodiments, the second set of feature vectors may be at least partly derived from a first portion of user data for the second population of students corresponding to a first time period occurring before a variable simulation time, and may be at least partly derived from a second portion of the user data corresponding to a second time period occurring after the variable simulation time. The first set of feature vectors is derived only from a third portion of the user data occurring before a defined prediction time.

In some embodiments, the defined prediction time may occur before the variable simulation time.

In some embodiments, the system may further include an error engine configured to compare the set of simulated test data to the set of risk predictions to generate a root mean square error (RMSE) value.

In some embodiments, the system may further include a comparison engine configured to compare the RMSE value to a threshold value to generate a result, wherein the resource management server determines that the first machine learning model is valid for predicting risk for the second population based on the result.

In some embodiments, the result may represent the RMSE value being less than the threshold value.

In some embodiments, the system may further include a training engine configured to retrieve a third set of feature vectors from the feature data store, the third set of feature vectors corresponding to a subset of students of the first population of students, train the first machine learning model based on the third set of feature vectors, retrieve a fourth set of feature vectors from the feature data store, the fourth set of feature vectors corresponding to the subset of students of the first population of students, and train the second machine learning model based on the fourth set of feature vectors.

In an example embodiment, a method may include steps for retrieving, by a model server from a model data store, a first definition of a first machine learning model that is trained to make risk predictions for a first population of students, retrieving, by the model server from a model data store, a second definition of a second machine learning model that is trained to simulate test data for the first population of students, executing, by the model server, the second machine learning model to generate a set of simulated test data for a subset of students of a second population of students, executing, by the model server, the first machine learning model to generate a set of risk predictions for the second population of students, and validating, by a resource management server, the first machine learning model as being applicable to the second population of students based on the set of simulated test data and the set of risk predictions.

In some embodiments, the set of simulated test data may be generated based on a first set of feature vectors. The set of risk predictions may be generated based on a second set of feature vectors. The first set of feature vectors may include first features derived from first student activity data occurring only before a variable simulation time and second features derived from second student activity data occurring only after the variable simulation time. The second set of feature vectors may include third features derived from third student activity data occurring only before a defined prediction time. The first set of features and the second set of features may be stored in a feature data store.

In some embodiments, the variable simulation time may occur after the defined prediction time.

In some embodiments, the method may further include a step for comparing, with an error engine, the set of simulated test data to the set of risk predictions to generate a root mean square error (RMSE) value.

In some embodiments, the method may further include a step of comparing, with a comparison engine, the RMSE value to a threshold value to generate a result. Validating the first machine learning model may include validating, with the resource management server, the first machine learning model as being applicable to the second population of students based on the result.

In some embodiments, the method may further include steps for retrieving, with a training engine, a third set of feature vectors from the feature data store, the third set of feature vectors corresponding to a subset of students of the first population of students, training, with the training engine, the first machine learning model based on the third set of feature vectors, retrieving, with the training engine, a fourth set of feature vectors from the feature data store, the fourth set of feature vectors corresponding to the subset of students of the first population of students, and training, with the training engine, the second machine learning model based on the fourth set of feature vectors.

In an example embodiment, a system may include a model server and a resource management server. The model server may be configured to execute first instructions for implementing a first machine learning model to generate a set of risk predictions. The first machine learning model may be trained to predict risk for a first population having first characteristics. The set of risk predictions may be generated for a second population having second characteristics. The model server, when executing the first instructions may further implement a second machine learning model to generate a set of simulated dependent variable data for the second population. The second machine learning model may be trained to simulate test data for the first population. The resource management server may be configured to execute second instructions for determining, based on the set of simulated dependent variable data and the set of risk predictions, that the first machine learning model is valid for predicting risk for the second population.

In some embodiments, the set of simulated dependent variable data may be generated based on a first set of feature vectors. The set of risk predictions may be generated based on a second set of feature vectors. The first set of feature vectors may include first features derived from first activity data occurring before a variable simulation time and second features derived from second activity data occurring after the variable simulation time. The second set of feature vectors may include only third features derived from only third activity data occurring before a defined prediction time.

In some embodiments, the defined prediction time may occur prior to the variable simulation time.

In some embodiments, the system may further include an error engine configured to execute third instructions for comparing the set of simulated dependent variable data to the set of risk predictions to generate a root mean square error (RMSE) value.

In some embodiments, the system may further include a comparison engine configured to execute fourth instructions for comparing the RMSE value to a threshold value to generate a result. The resource management server may determine that the first machine learning model is valid for predicting risk for the second population based on the result.

In some embodiments, the system may further include a training engine configured to execute third instructions for retrieving a third set of feature vectors corresponding to a subset of the first population, training the first machine learning model based on the third set of feature vectors, retrieving a fourth set of feature vectors corresponding to the subset of the first population, and training the second machine learning model based on the fourth set of feature vectors.

In some embodiments, the first population may be a first population of students. The second population may be a second population of students. The simulated dependent variable data may include simulated test score. The set of risk predictions may include a prediction of risk that a given student will fail to achieve a defined outcome in a course in which the student is enrolled.

The above features and advantages of the present invention will be better understood from the following detailed description taken in conjunction with the accompanying drawings.

DETAILED DESCRIPTION

Figure 1:
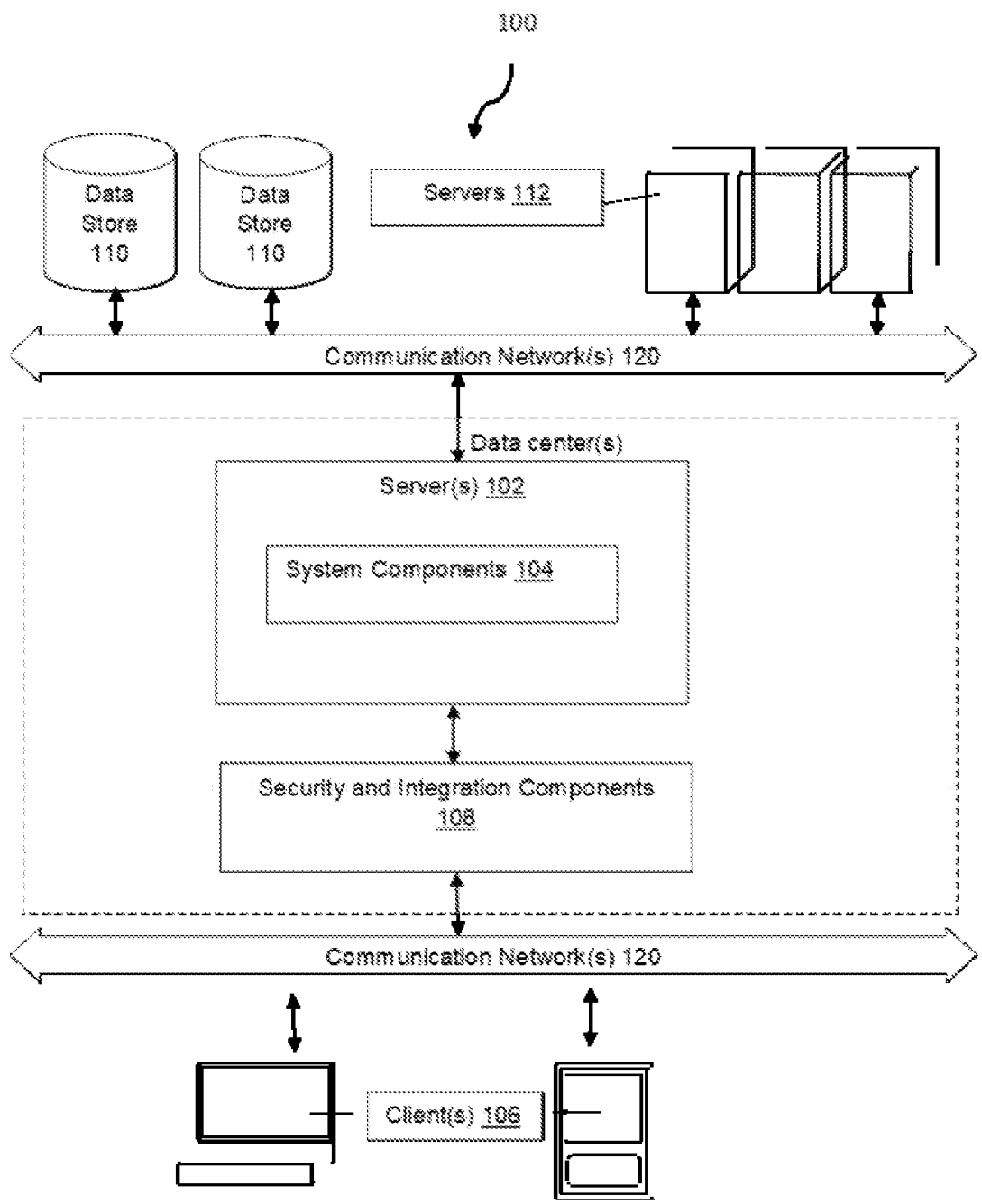
FIG. 1 illustrates a system level block diagram showing data stores, data centers, servers, and clients of a distributed computing environment, in accordance with an embodiment.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Network

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120.

Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Servers/Clients

Figure 2:
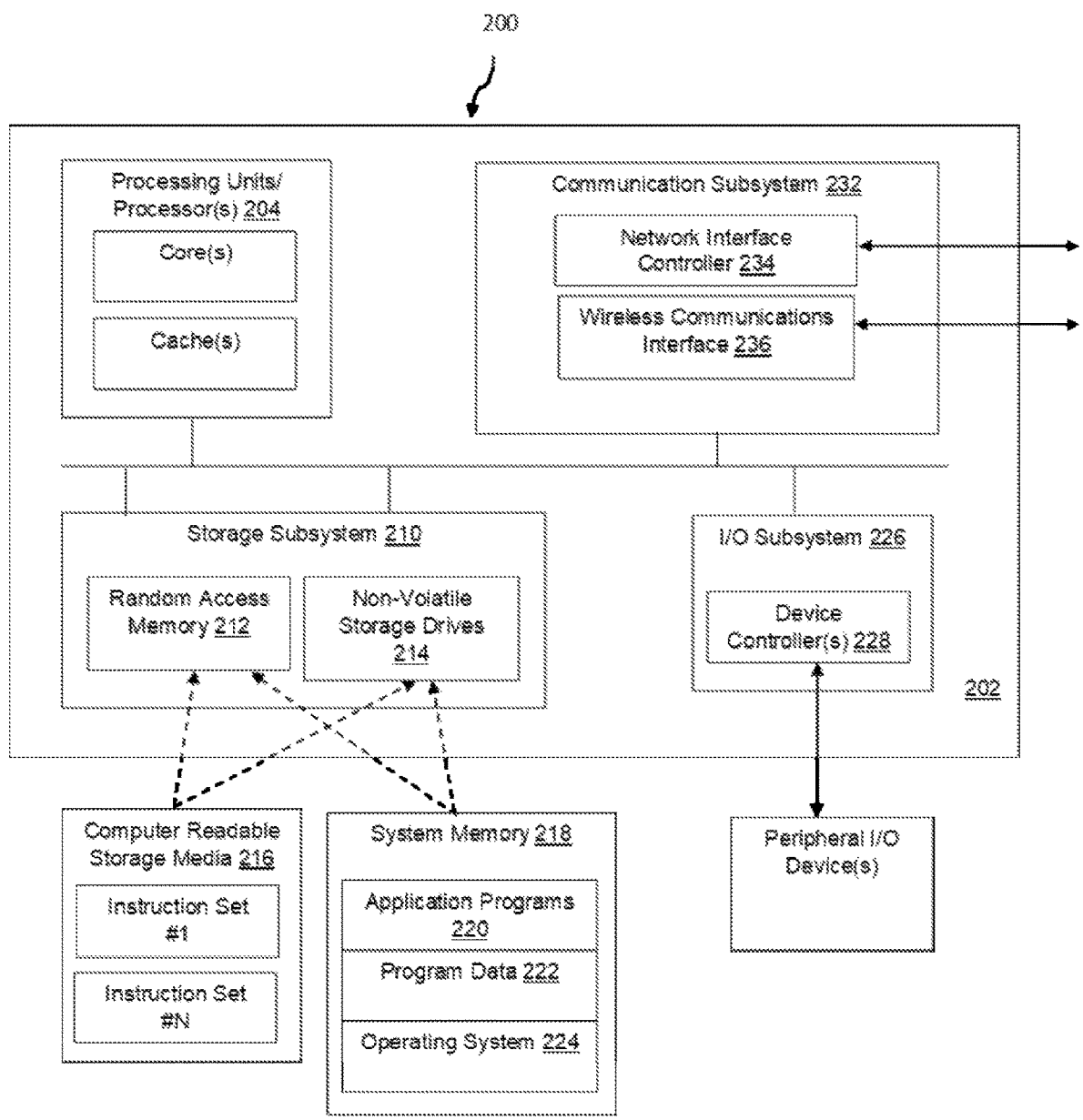
FIG. 2 illustrates a system level block diagram showing physical and logical components of a special-purpose computer device within a distributed computing environment, in accordance with an embodiment.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

Security

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Data Stores (Databases)

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

Computer System

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

Processors

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Buses

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

Input/Output

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

Input

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

Output

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Memory or Storage Media

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Computer Readable Storage Media

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communication Interface

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

Input Output Streams Etc.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

Connect Components to System

The various physical components of the communications subsystem 232 may be detachable components coupled to the computer system 200 via a computer network, a Fire-Wire® bus, or the like, and/or may be physically integrated onto a motherboard of the computer system 200. Communications subsystem 232 also may be implemented in whole or in part by software.

Other Variations

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 3A:
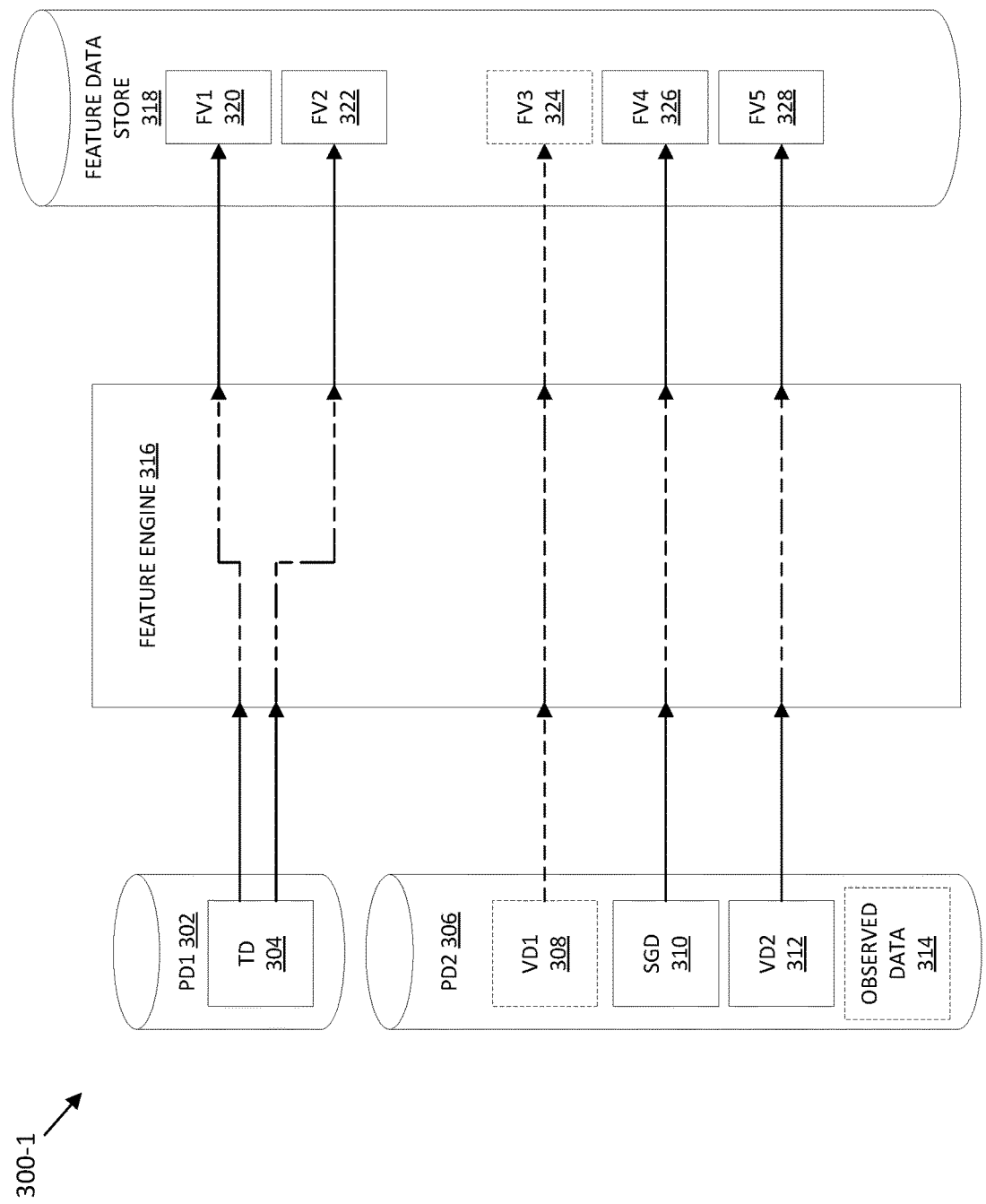
FIG. 3A illustrates a block diagram showing an example data flow for data from different population data stores being processed by a feature engine to generate different sets of feature vectors, in accordance with an embodiment.
Figure 3B:
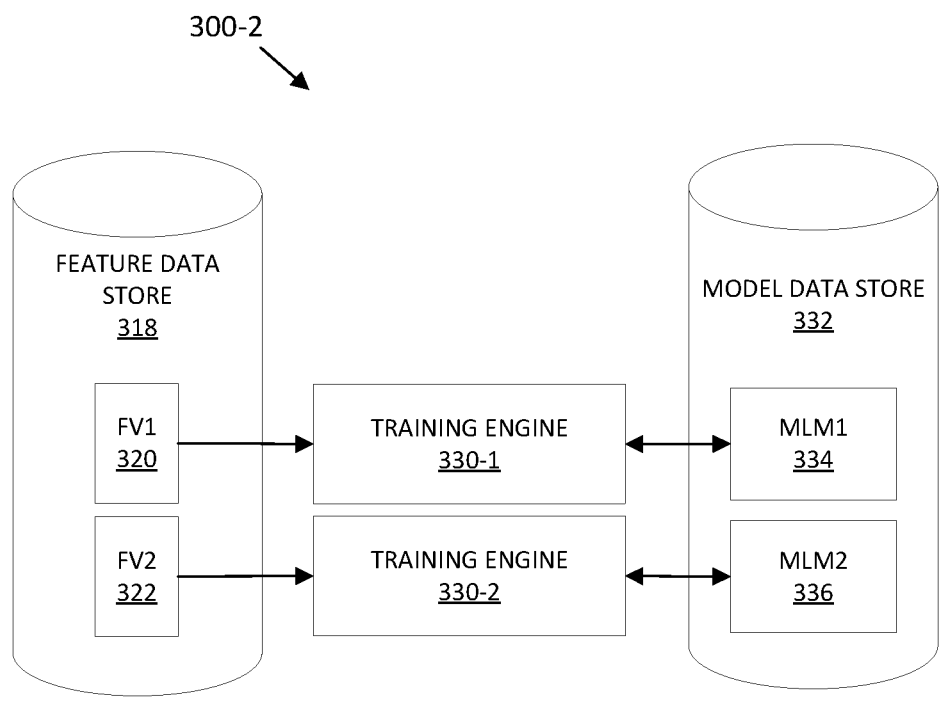
FIG. 3B illustrates a block diagram showing an example data flow for sets of feature vectors from the feature vector data store being processed by one or more training engines to train machine learning models, in accordance with an embodiment.
Figure 3C:
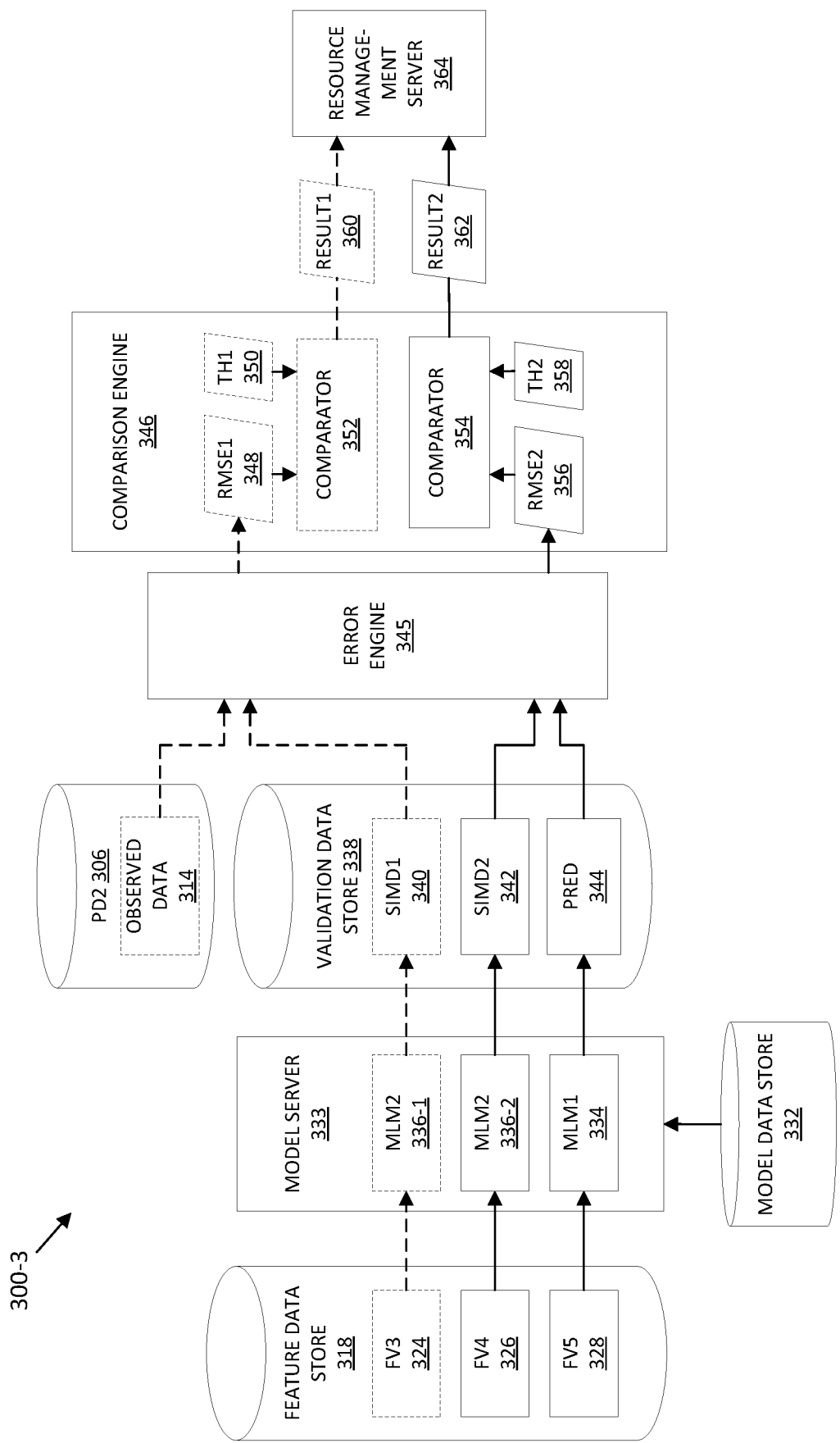
FIG. 3C illustrates a block diagram showing an example data flow for sets of feature vectors from the feature vector data store being processed by trained machine learning models being executed at a model server to produce sets of validation data, and for the sets of validation data and test data from a population data store being processed by a comparison engine to produce validation results, in accordance with an embodiment.

FIGS. 3A-3C illustrate various aspects of a system 300 by which a first predictive model, such as a machine learning model, may be trained to predict a dependent variable regarding (e.g., representing and/or characterizing) some aspect of a first population, and may then be validated for use in predicting the same dependent variable for a second population having different characteristics or circumstances compared to those of the first population. In order to perform this validation, a second predictive model (e.g., machine learning model) may be trained to simulate dependent variable values (e.g., test scores) for the first population based on applicable available data (i.e., data occurring before and after the time for which a given dependent variable value is simulated) and may then be applied to generate simulated dependent variables for the second population, which predictions made by the first machine learning model may be validated against. As an illustrative example, the system 300 will be described in the context of e-learning applications (e.g., which may be implemented via the distributed computing environment 100 of FIG. 1) in the example of FIGS. 3A-3C.

FIG. 3A shows an illustrative block diagram of a portion 300-1 of the system 300, showing data flow through a feature engine 316. A first population database (PD1) 302 may include training data (TD) 304. A second population database (PD2) 306 may include first validation data (VD1), simulation generation data (SGD) 310, second validation data (VD2) 312, and observed data 314. In some embodiments, the inclusion of the VD1 308 and the observed data 314 may be optionally omitted, such as when no observed dependent variable data (i.e., the dependent variable data to be predicted using the machine learning model) exists for the second population. A feature data store 318 may include a first set of feature vectors (FV1) 320, a second set of feature vectors (FV2) 322, a third set of feature vectors (FV3) 324, a fourth set of feature vectors (FV4) 326, and a fifth set of feature vectors (FV5) 328. In some embodiments, the calculation of the FV3 324 may be optionally omitted, such as when VD1 308 and observed data 314 are not included in the PD2 306, as in the above example. The PD1 302 and the PD2 306 may be coupled to one or more inputs of the feature engine 316, and the feature data store 318 may be coupled to one or more outputs of the feature engine 316.

Data of PD1 302 representing the first population may have circumstances or characteristics that differ from data of PD2 306 representing the second population in some way. In some embodiments, the first population and second population represented in PD1 and PD2 may represent two different populations of students (sometimes referred to as "users") having performed activities in respectively different courses and/or in courses within respectively different subject areas (e.g., mathematics courses vs. non-mathematics courses such as history, literature and/or language). For example, data stored in the PD1 302 may represent activity data collected from the first population of students' observed activity in mathematics courses, while data stored in the PD2 306 may represent activity data collected for the second population of students' activity in non-mathematics courses. In some embodiments, a student could belong to both the first population and the second population if activity data has been collected for that student in both mathematics courses and non-mathematics courses. In other embodiments, the two populations could be mutually exclusive.

The feature engine 316 may be implemented by executing computer-readable instructions with one or more computer processors of one or more servers (e.g., servers 102, 112, FIG. 1). The feature engine 316 may be configured to extract features from input data (e.g., TD 304, VD1 308, SGD 310, VD2 312, observed data 314, etc.) to populate feature vectors of sets of feature vectors (e.g., sets of feature vectors FV1 320, FV2 322, FV3 324, FV4 326, FV5 328, etc.). All of the feature vectors of the sets of feature vectors FV1 320, and FV5 328 may each include the same features. All of the feature vectors of the sets of feature vectors FV2 322, FV3 324, FV4 326, may include the same features. The features of the sets of feature vectors FV1 320, and FV5 328 may differ from the features of the set of feature vectors FV2 322, FV3 324, FV4 326, as will be described. Each feature vector within one of the sets of feature vectors may correspond to a respective, individual user, and may be considered a user-specific (e.g., or "item-specific" for embodiments in which predictions are made for items, not for users, such as when predicting expiration dates for yogurt) feature vector). It should be understood that the individual feature values across different feature vectors will generally differ, even if those feature vectors include the same features. In other words, a "feature" described herein may generally be considered to be a measurable property or characteristic related to the user or item for which a prediction is being made, whereas the feature value is the specific value of that property or characteristic for the related user/item.

For example, for embodiments in which risk predictions are being made for a student, the features may include any or all of: a homework load (e.g., which may be quantified as a user's average homework score over a recent defined period of time, such as the past three weeks); a guessing rate (e.g., quantified via a Hurst coefficient calculated for the student); average correct on first try percent (CFT %); an average score which can include an average homework score and/or an average test score; an average part score; a number of attempted parts; an average number of attempted parts; an average number of attempts per part; and/or an aggregation parameter such as one or several course level aggregations (e.g., average test scores or homework scores of the user within a given section, chapter, title, course, etc.).

In some embodiments, the Hurst coefficient can be a measure of instability in responses received from a user, and specifically a measure of randomness in correct/incorrect responses to one or several questions, and may quantify the guessing rate of the user. The Hurst coefficient can be calculated across a window of data, which window can be limited to a specified time period and/or to a specified number of response.

The average correct on first try percent (CFT %) can be a value indicating the average percent of questions to which the student-user submitted a correct response on a first try. The CFT % can be an indicator of changes to correctness stability. In some embodiments, a given value of this feature can be updated with each additional response received from the student-user. In some embodiments, the average correct on first try percent can be calculated by dividing the number of response that were correct on the first try by the number of questions for which responses were received. In some embodiments, the CFT % can be stored as a percent, or as a normalized value between 0 and 1.

The average score which can include an average homework score and/or an average test score can be the average score received by the user on, for example, homework and/or tests within the window. The average part score can identify the average score received by the user on different problem parts. In some embodiments, for example, a problem can include multiple parts, each of which can be independent evaluated. The average part score can be, for example, the average number of points received for a problem part and/or a percent indicating the average percent of points received per problem part. In some embodiments, the number of attempted parts can be a count of the number of total attempted parts of questions, and the average number of attempted parts can be the average number of attempted parts per question. In some embodiments, the average number of attempts per part can be the average number of attempts for each problem part before the user quits further attempts or correctly responds to the problem part. In some embodiments, the aggregation parameter can include a course level average such as, for example, an average percent correct across all students within a course, and the aggregation parameter can include one or several course level aggregations which can be a delta value indicating the difference between a feature generated for an individual and a similar feature generated for the course.

In some embodiments, some or all of the above features can be generated by the feature engine 316 from data collected within a window, which window can be a temporally bounded window, or a window bounded by a number of received responses. In such an embodiment, for example, the window can be a sliding window, also referred to herein as a sliding temporal window that can include information relating to some or all of one or several users' interaction with the content distribution network during a designated time period such as, for example, a 1 week time period, a ten day time period, a two week time period, a three week time period, a four week time period, a six week time period, a twelve week time period, or any other or intermediate period of time. In some embodiments, only data occurring within a defined time window (e.g., within a "past" time window or a "future" time window with respect to a variable simulation time $T_X$ and whether the feature is defined as being derived from future data, past data, or both) may be used to generate a given feature.

For example, the sets of feature vectors FV2 322, FV3 324, FV4 326 may include both "future" and "past" variants of any of the features listed above, with respect to a defined variable simulation time, denoted herein as $T_X$, occurring before the present time, denoted herein as $T_0$, (e.g., a future homework load, a past homework load, a future guessing rate, a past guessing rate, a future average CFT %; a past CFT %, a future average test score, a past average test score, a future average homework score, a past average homework score, a future average part score, a past average part score; a future number of attempted parts, a past number of attempted parts, a past average number of attempted parts, a future average number of attempted parts, a past average number of attempts per part, a future average number of attempts per part, a future aggregation parameter, and/or a past aggregation parameter). It should be understood that the feature vectors FV2 322, FV3 324, FV4 326 may include feature vectors corresponding to a number of different variable simulation times $T_X$, and the "past" time period and "future" time period will differ in length for different values of $T_X$. In the present example, "future" features may be derived from data points occurring between a variable simulation time $T_X$ (e.g., the time for which simulated test data is being generated by the second machine learning model MLM2) and the present time $T_0$, while "past" features may be derived from data points occurring only before the variable simulation time.

The sets of feature vectors FV1 320 and FV5 328 may only include "past" features relative to a prediction time, denoted herein as $T_P$, at which a prediction is being made. Here, the "past" features may be derived from data points occurring before the prediction time $T_P$. For example, in order to validate a machine learning model (e.g., MLM1), a prediction time $T_P$ should be selected occurring prior to the present time $T_0$, as activity data occurring between $T_P$ and $T_0$ would need to be used as a basis to validate the machine learning model.

Figure 5:
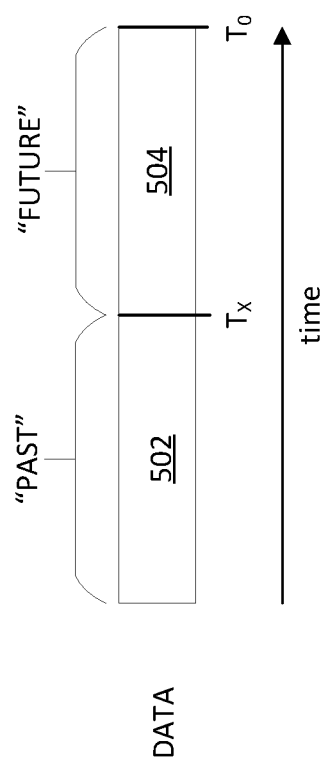
FIG. 5 illustrates a division of user/activity data into "past" data and "future" data, with past data corresponding to times occurring prior to a prediction time $T_X$ and future data corresponding to times occurring following the prediction time $T_X$, in accordance with an embodiment.

An example of how a data set (e.g. TD 304, VD1 308, SGD 310) may be divided into "past" and "future" data subsets, given a variable simulation time $T_X$ occurring prior to a current time $T_0$ is shown in FIG. 5. As shown, a first data subset 502 of the data having been collected prior to variable simulation time $T_X$ may be used to generate "past" features, while a second data subset 504 of data having been collected between variable simulation time $T_X$ and present time $T_0$ may be used to generate "future" features. The length of the first data subset 502 and the length of the second data subset 504 should generally differ with different values of $T_X$.

Returning to FIG. 3A, the feature engine 316 may generate features to populate the set of feature vectors FV1 320 by analyzing the TD 304. The TD 304 may include data points for a subset of the first population of users designated to train first and second machine learning models (e.g., models 334, 336, of FIG. 3B). The set of feature vectors FV1 320 may include only features derived from data points occurring prior to the prediction time $T_P$, as defined above.

The feature engine 316 may generate features to populate the set of feature vectors FV2 322 by analyzing the TD 304. The set of feature vectors FV2 322 may include both "past" features and "future" features with respect to one or more variable simulation times $T_X$, as defined above.

The feature engine 316 may optionally generate features to populate the set of feature vectors FV3 324 by analyzing the VD1 304. The VD1 308 may include data points for a subset of the second population of users who may be designated to provide validation for the second machine learning model (e.g., MLM2 336 of FIG. 3B), as will be explained. The set of feature vectors FV3 324 may include both "past" features and "future" features with respect to one or more variable simulation times $T_X$, as defined above.

The feature engine 316 may generate features to populate the set of feature vectors FV4 326 by analyzing the SGD 310. The SGD 310 may include data points for a subset of the second population of users designated be used as a basis for generating simulated (e.g., "faux") dependent variable data when processed by the second machine learning model (e.g., following validation of the second machine learning model using VD1 304), as will be explained. The set of feature vectors FV4 326 may include both "past" features and "future" features with respect to one or more variable simulation times $T_X$, as defined above.

The feature engine 316 may generate features to populate the set of feature vectors FV5 328 by analyzing the VD2 312. The VD2 312 may include data points for a subset of the second population of users designated to provide validation for the first machine learning model, as will be explained. The set of feature vectors FV5 328 may include only features derived from data points occurring prior to the prediction time $T_P$, as defined above.

Turning to FIG. 3B, an illustrative block diagram of portion 300-2 of the system 300, showing data flow to and from training engines 330-1 and 330-2 when machine learning models MLM1 334 and MLM2 336, defined in a model data store 332, are being trained.

The model data store 332, can store information relating to (e.g., defining) one or several predictive models. For example, the predictive model(s) may include artificial intelligence based models such as machine learning models (MLMs), classifiers, and/or the like. The predictive models can be, for example, statistical models. In some embodiments, the machine-learning algorithms or processes can include one or several classifiers such as a linear classifier. For example, the machine-learning algorithms can include at least one of: a Random Forest algorithm; an Artificial Neural Network; an AdaBoost algorithm; a Naïve Bayes algorithm; Boosting Tree, and a Support Vector Machine.

In the example of neural networks, a neural network model may include various components configured to generate and manage artificial neural network data structures used to perform decision-making and/or predictive analyses based on feature data (e.g., a feature vector) received by the neural network. The features may be descriptive or one or more characteristics of an entity about which the neural network is making a prediction. Neural network data structures may be designed, constructed, and trained by adaptive learning processes to analyze complex sets of inputs and provide predictive outputs (e.g., a student outcome prediction corresponding to the expected risk that a student corresponding to the data input to the neural network model will fail to achieve an expected outcome).

The model data store 332 may include a first machine learning model (MLM1) 334 and a second machine learning model (MLM2) 336.

As an example, the MLM1 334 may be trained to predict whether a student is "at risk" or "not at risk" of an undesirable outcome (e.g., not completing a homework assignment, not completing a course, not correctly responding to a predetermined percentage of remaining item parts of an assessment being delivered to the student, failing an assessment, failing a course, being in the bottom 10% or other predetermined percentage of a class of students, having an average test score or average homework score below one or more predetermined thresholds, earning lower than a predefined threshold score on a particular test, or other applicable undesirable outcomes) based on one or several features (e.g., corresponding to the features included in FV1 320 and FV5 328). In some embodiments, the MLM1 334 may be trained to predict the specific test or homework average that a user will have upon completion of a corresponding course. In some embodiments, the MLM1 334 may be trained to predict specific test scores and/or specific homework scores for a given student.

Generally, the MLM1 334 may be represented by an equation in which one or more sequences of operations are performed on a number of independent variables (e.g., input features) to determine the value of a dependent variable (e.g., the prediction output by the MLM1 334). With this representation in mind, MLM2 336 may be trained to predict such dependent variable values, to which predictions made by the MLM1 334 may be compared for validation of the MLM1 334.

As an example, when the MLM1 334 is trained to predict test scores, the MLM2 336 may be trained to predict or "simulate" individual user test scores at one or more specific variable simulation times $T_X$ (e.g., based on the features included in FV2 322, FV3 324, and/or FV4 326). The variable simulation time(s) may occur prior to a present time $T_0$ at which the MLM2 336 is being executed. Some of the features input to the MLM2 336 to simulate one or more test scores for a given user may be derived from user/activity data (here, referring to user/activity data associated with the given user, specifically) occurring prior to a given variable simulation time $T_X$, others may be derived from user data occurring between the variable simulation time $T_X$ and the present time $T_0$, and still others may be derived from all applicable available data points of the user/activity data.

It should be understood that the above examples are intended to be illustrative and not limiting. Beyond the electronic-learning (e-learning) applications described herein, the MLM1 334 or MLM2 336 could be trained to predict any observable characteristic of any user/object/entity/event based on applicable input features. For example, the MLM1 334 and MLM2 336 could be trained to predict expiration dates of yogurt based on characteristics of cultures present in the yogurt, or could be trained to predict likelihood that a mortgagee will default on a home mortgage based on features related to the mortgagee's financial history.

The training engines 330 (including training engine 330-1 and training engine 330-2) may be implemented by executing computer-readable instructions with one or more computer processors of one or more servers (e.g., servers 102, 112, FIG. 1), and may be communicatively coupled to the feature data store 318 and the model data store 332. The training engines 330 can comprise any hardware, software, or any combination thereof that can train a predictive model.

The training engine 330-1 may receive the FV1 320 from the feature data store 318, and the definition of the MLM1 334 from the model data store 332. The MLM1 334 may be executed by the training engine 330-1, and may process, separately, each of the feature vectors of the FV1 320 to produce a corresponding first set of predictions (i.e., training predictions). The first set of training predictions may be validated against corresponding user data (i.e., of the first population). The MLM2 336 may be executed by the training engine 330-2, and may process, separately, each of the feature vectors of the FV2 322 to produce a corresponding set of simulated test data (i.e., training simulated test data). The set of simulated test data may be validated against corresponding user data (i.e., of the first population).

For example, if the MLM1 334 is being trained by the training engine 330-1 to predict test scores for the first population, the first set of training predictions may be compared to corresponding actual test scores of corresponding students from the first population. An error (e.g., root-mean-square error (RMSE)) may be calculated between the first set of training predictions and the corresponding actual test scores, and if the error is low (e.g., it is below a predetermined threshold), the MLM1 334 may be considered valid for making predictions for the first population. Otherwise, if the error is not low (e.g., it is above the predetermined threshold), parameters (i.e., model parameters) of the MLM1 334 (e.g., as defined in the model data store 332) may be adjusted, and the training and validation process for the MLM1 334 may then be repeated until the MLM1 334 is successfully validated.

Continuing the example, the MLM2 336 may be trained by the training engine 330-2 to simulate test scores for the first population. The set of simulated test data may be compared to corresponding actual test scores of corresponding students from the first population. An error (e.g., (RMSE)) may be calculated between the set of simulated test data and the corresponding actual test scores, and if the error is low (e.g., it is below a predetermined threshold), the MLM2 336 may be considered valid for making predictions for the first population. Otherwise, if the error is not low (e.g., it is above the predetermined threshold), parameters (i.e., model parameters) of the MLM2 336 (e.g., as defined in the model data store 332) may be adjusted, and the training and validation process for the MLM2 336 may then be repeated until the MLM2 336 is successfully validated. In some embodiments, the MLM2 may only be partially validated, such as when the MLM2 is found to be valid for simulating data for certain dates/times, but not for others. For example, the MLM2 may be found valid for simulating mid-term test scores for the first population, but may not be valid for simulating final test scores for the first population, and would thus be considered "partially validated".

Turning to FIG. 3C, an illustrative block diagram of portion 300-3 of the system 300, showing data flow corresponding to the generation of simulated dependent variable data (e.g., simulated/faux test scores) and subsequent use of the simulated dependent variable data to validate MLM1 334. As shown, the portion 300-3 may include the feature data store 318, the model data store 332, a model server 333, a validation data store 338, the PD2 306, an error engine 345, a comparison engine 346, and a resource management server 364.

The model server 333 (e.g., servers 102, 112, FIG. 1), may be communicatively coupled to the feature data store 318, the model data store 332, and the validation data store 338. The model server 333 may, using one or more processors, retrieve definitions of the MLM1 334 and the MLM2 336, and may execute one or more instances of the MLM1 334 and the MLM2 336.

For example, for embodiments in which the FV3 324 is optionally available (e.g., requiring that at least some dependent variable data is available for the second population, and optionally that validation of the MLM2 336 against the available dependent variable data is enabled), the model server 333 may retrieve the FV3 324 from the feature data store 318 and may process each feature vector in the FV3 324 with a first instance of the MLM2 336 (MLM2 336-1) to generate simulated data for the second population, which may be organized and stored as a first set of simulated data SIMD1 340 (e.g., which may be a set of simulated test scores or other simulated dependent variable values) at the validation data store 338. The SIMD1 340 may be generated by the MLM2 336-1 for one or more variable simulation times $T_X$, occurring before the present time $T_0$, and after a prediction time $T_P$ at which the MLM1 334 is presently configured to make predictions, for example.

The error engine 345 may be implemented by executing computer-readable instructions with one or more computer processors of one or more servers (e.g., servers 102, 112, FIG. 1), and may be communicatively coupled to the validation data store 338, the PD2 306 (optional), and the comparison engine 346. For embodiments in which the FV3 324 is optionally available, the error engine 345 may retrieve the SIMD1 340 from the validation data store 338 and may retrieve corresponding portions of the observed data 314 from the PD 306. For example, the corresponding portions of the observed data 314 may include actual test scores for the subset of the second population of students represented in the VD 301 from which the FV3 was derived by the MLM2 336-1. In some embodiments, the VD 301 may include only students for which one or more actual test scores are available for the time period between at least one variable simulation time $T_X$ and $T_0$, and/or only variable simulation times $T_X$ for which user/activity data is available for the time period between a given $T_X$ and $T_0$ may be selected. For embodiments in which the FV3 324 is optionally available, the error engine 345 may calculate a first root mean square error (RMSE1) 348 between the corresponding portions of the observed data 314 and the set of simulated data of the SIMD1 340. For example, the error engine 345 may calculate the RMSE1 348 between test scores of the corresponding portions of the observed data 314 and simulated test scores of the SIMD1 340. The RMSE1 348 may be output to the comparison engine 346.

The comparison engine 346 may be implemented by executing computer-readable instructions with one or more computer processors of one or more servers (e.g., servers 102, 112, FIG. 1), and may be communicatively coupled to error engine 345 and the resource management server 364. For embodiments in which the FV3 324 is optionally available, the comparison engine 346 may receive the RMSE1 348 from the error engine 345. The comparison engine 346 may compare the RMSE1 348 to a predetermined threshold TH1 350 using, for example, a comparator 352 to produce a first result RESULT1 360. The RESULT1 360 may be output to the resource management server 364. For example, the comparison engine 346 may retrieve the threshold TH1 350 from a threshold data store (not shown) that is communicatively coupled to the comparison engine 346 (e.g., or the server or servers implementing the comparison engine 346).

For embodiments in which the FV3 324 is optionally available, the resource management server 364 (e.g., servers 102, 112, FIG. 1) may receive the RESULT1 360, and may determine that the MLM2 336 is valid for making predictions for the second population if the RESULT1 360 indicates that the RMSE1 348 is less than the TH1 350 (e.g., as this is indicative of comparatively low error between the simulated data of the SIMD1 340 and the corresponding portions of the observed data 314). For example, the resource management server 364 may alter one or more database entries of a data store (e.g., of data stores 110 of FIG. 1) of the system 300 to indicate that the MLM2 336 is valid. In some embodiments, in response to determining that the RMSE1 348 is greater than the TH1 350 (which may indicate that the MLM2 336 is not sufficiently accurate to make predictions for the second population), the resource management server 364 may cause hyper-parameters of the MLM2 336 to be adjusted. If the resource management server 364 causes hyper-parameters of the MLM2 336 to be adjusted, the system 300 (e.g., via the resource management server 364) may cause the training engine 330-2 to re-train the MLM2 336 using the FV2 322, then may process the FV3 324 with the adjusted MLM2 336 to produce a new set of simulated data SIMD1 340, and the RMSE1 348 may be recalculated, compared again to the TH1 350 to produce a new RESULT1 360. This process may generally repeat until the MLM2 336 is successfully validated. However, in some embodiments, the process may end without successfully validating the MLM2 336, either the first time the MLM2 336 fails to successfully validate (i.e., without adjusting the MLM2 hyper-parameters and without testing the MLM2 further) or if more than a predetermined threshold number of iterations the process or a sub-process thereof have been performed. In some embodiments, the MLM2 may only be partially validated, such as when the MLM2 is found to be valid for simulating data for certain dates/times, but not for others. For example, the MLM2 may be found valid for simulating mid-term test scores, but may not be valid for simulating final test scores, and would thus be considered "partially validated".

To reiterate, the inclusion and/or utilization of the VD1 308, the observed data 314, the FV3 324, the MLM2 336-1, the SIMD1 340, the RMSE 348, the TH1 350, the comparator 352, and the result 360 described above may be considered optional, and may be used for embodiments in which applicable/sufficient observed dependent variable data exists within the observed data 314. Otherwise, (e.g., if no observed dependent variable data exists for the second population), some or all of these elements and associated processes may be omitted from the system 300-3.

The model server may retrieve the FV4 326 from the feature data store 318 and may process each feature vector in the FV4 326 with a second instance of the MLM2 336 (MLM2 336-2) to generate simulation data for the second population, which may be organized and stored as simulated data SIMD2 342 (e.g., which may be a set of simulated test scores or other simulated dependent variable values) at the validation data store 338. For embodiments in which the MLM336 is validated against the observed data 314 of the second population, the SIMD2 342 will generally be generated by the MLM2 336-2 following validation of the MLM2 336-2 based on the comparison between the SIMD1 340 and the applicable portion of the observed data 314 at the comparison engine 346. The SIMD2 342 may be generated by the MLM2 336-1 for one or more variable simulation times $T_X$, occurring before the present time $T_0$, for example.

The model server may retrieve the FV5 328 from the feature data store 318 and may process each feature vector in the FV5 328 with an instance of the MLM1 334 to generate predictions for the second population, which may be organized and stored as a second set of predictions PRED 344 (e.g., which may be a set of predicted test scores or other predicted dependent variable values) at the validation data store 338. The features used to generate the predictions PRED 344 may correspond to a prediction time $T_P$, occurring prior to the present time $T_0$. Only variable simulation times $T_X$ occurring between $T_P$ and $T_0$ can be selected for validation of the MLM1 344 for the second population.

The error engine 345 may retrieve the SIMD2 342 and the PRED 344. The error engine 345 may calculate a second root mean square error (RMSE2) 356 between the simulated data of the SIMD2 342 and the predictions of the PRED 344. For example, the error engine 345 may compare simulated test scores of the SIMD2 342 to predicted test scores of the PRED 344 to calculate the RMSE2 356. In some embodiments, it is not required to validate the MLM2 336 for use in simulating data for the second population prior to generating the SIMD2 342 and the RMSE2 356.

The comparison engine 346 may receive the RMSE2 356 from the error engine 345, and may then compare the RMSE 2 356 to a threshold TH2 358 using, for example, a comparator 354 to produce a second result RESULT2 362. The comparison engine 346 may send the RESULT2 362 to the resource management server 364. For example, the comparison engine 346 may retrieve the threshold TH2 358 from a threshold data store (not shown) that is communicatively coupled to the comparison engine 346 (e.g., or the server or servers implementing the comparison engine 346).

The resource management server 364 may receive the RESULT2 362 from the comparison engine 346. The resource management server 364 may determine that the MLM1 334 is valid for making predictions for the second population if the RESULT2 362 indicates that the RMSE2 356 is less than the TH2 358 (e.g., as this is indicative of comparatively low error between the predictions of the PRED 344 and the simulated data of the SIMD2 342). For example, in response to determining that the RMSE2 356 is less than the TH2 358, the resource management server 364 may alter one or more database entries of a data store (e.g., of data stores 110 of FIG. 1) of the system 300 to indicate that the MLM1 334 is valid.

In some embodiments, the resource management server 364 may simply flag the MLM1 334 as invalid for making predictions for the second population if the RMSE2 356 is greater than the TH2 358, without attempting to adjust hyper-parameters of the MLM1 334.

In other embodiments, in response to determining that the RMSE2 356 is greater than the TH2 358 (which may indicate that the MLM1 334 is not sufficiently accurate to make predictions for the second population), the resource management server 364 may cause hyper-parameters of the MLM1 334 to be adjusted. For example, if the resource management server 364 causes hyper-parameters of the MLM1 334 to be adjusted, the system 300 (e.g., via the resource management server 364) may cause the training engine 330-1 to re-train the MLM1 334 using the FV1 320, then may process the FV5 328 with the adjusted MLM1 334 to produce a new set of predictions PRED 344, and the RMSE2 356 may be recalculated, compared again to the TH2 358 to produce a new RESULT2 362. This process may generally repeat until the MLM1 334 is successfully validated. However, in some embodiments, the process may end without successfully validating the MLM2 336, if more than a predetermined threshold number of iterations the process or a sub-process thereof have been performed. It should be understood that the data stores 302, 306, 318, 332, and 338 of FIGS. 3A-3C may be stored in one or more memory devices of the same server or may be stored separately or in any combination across multiple different servers in a distributed computing environment (e.g., such as data stores 110 of servers 102, 112 in the distributed computing environment 100 of FIG. 1).

Figure 4:
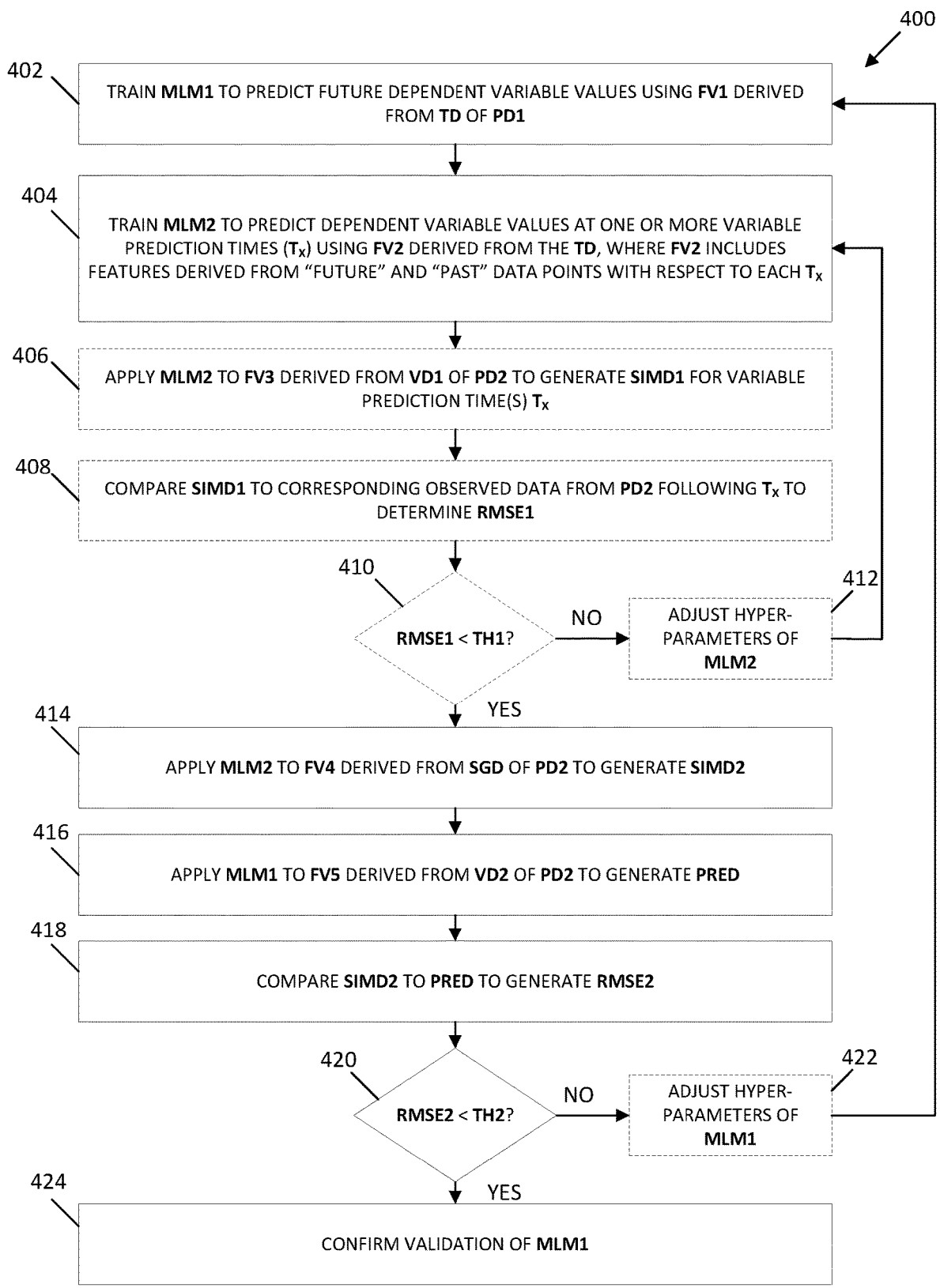
FIG. 4 illustrates a process flow for a method by which the system of FIGS. 3A-3C may operate to validate a machine learning model for use with a different population, in accordance with an embodiment.

FIG. 4 shows a method 400 by which a machine learning model MLM1 (e.g., MLM1 334 of FIGS. 3B-3C), trained to make predictions for a first population, may be validated to make predictions for a second population having different characteristics than the first population, based on simulated/faux test data generated by a second machine learning model MLM2 (e.g. MLM2 336 of FIGS. 3B-3C). The method 400 may be performed via the execution of computer-readable instructions by one or more computer processors, which may be included in a single server or distributed across multiple servers (e.g., servers 102, 112, model server 333, resource management server 364, FIGS. 1, 3C). The performance of each step will be described with respect to one such processor.

At step 402, the processor causes a training engine (e.g., training engine 330-1 of FIG. 3B) to train the first machine learning model MLM1 to predict future dependent variable values (e.g., future test scores) for a first population using a first set of feature vectors FV1 (e.g., FV1 320, FIGS. 3A, 3B) derived from a set of test data TD (e.g., TD 304 of FIG. 3A) of a first population data store PD1 (e.g., PD1 302, FIGS. 3A, 3B). The MLM1 may include manually defined set of hyper-parameters defining a portion of its operation, and may include a set of model parameters that are defined through this training. For example, the training of the MLM1 may involve adjusting the model parameters of the MLM1 to minimize a loss function over multiple iterations of processing the FV1 with the MLM1.

At step 404, the processor causes a training engine (e.g., training engine 330-2 of FIG. 3B) to train the second machine learning model MLM2 to simulate dependent variable values (e.g., test scores) for the first population for one or more variable simulation times $T_X$ using a second set of feature vectors FV2 (e.g., FV2 322, FIGS. 3A, 3B) derived from the set of test data TD of the first population data store PD1. The MLM2 may include manually defined set of hyper-parameters defining a portion of its operation, and may include a set of model parameters that are defined through this training. For example, the training of the MLM2 may involve adjusting the model parameters of the MLM2 to minimize a loss function over multiple iterations of processing the FV2 with the MLM2. For a given variable simulation time $T_1$ of the variable simulation times $T_X$, the FV2 includes features derived from data points of the TD occurring prior to the variable simulation time $T_1$ as well as features derived from data points of the TD occurring after the variable simulation time $T_1$.

Steps 406-412, which are about to be described, may be considered optional. Steps 406-412 may be performed, for example, in embodiments in which applicable observed dependent variable data is available for the second population, against which simulated data generated by the MLM2 can be validated and, optionally, in which such validation of the MLM2 is enabled (e.g., as part of a system configuration stored in a memory device). For embodiments in which steps 406-412 are not performed, the method 400 may proceed directly to step 414 following the completion of step 404.

At step 406, processor causes the MLM2 to be applied to process a third set of feature vectors FV3 to generate a first set of simulated data SIMD1 for the one or more variable simulation times $T_X$. The FV3 is derived from first validation data VD1, which is a subset of a second population data store PD2.

At step 408, the processor causes the SIMD1 to be compared (e.g., via the error engine 345 of FIG. 3C) to corresponding observed data from the PD2 to determine a first RMSE value RMSE1, which represents the amount of error between the simulated data of SIMD1 and the actual observed data corresponding (e.g., representing the same items/users as those represented in the SIMD1, or items/users having sufficiently similar characteristics) to the simulated dependent variables of the simulated data.

At step 410, the processor causes the RMSE1 to be compared to a threshold value TH1. If RMSE1 is less than TH1, the MLM2 may be considered valid for simulating dependent variable data for the second population (at least for use as validation data), and the method 400 proceeds to step 414. Otherwise, if RMSE1 is greater than TH1, the method proceeds to step 412.

At step 412, which may be optional, the processor causes the hyper-parameters of MLM2 to be adjusted. The adjustment of the hyper-parameters of MLM2 may be performed automatically by the processor, or the processor may generate and send a prompt to an authorized user, requesting that the hyper-parameters of MLM2 be adjusted. The method 400 then returns to step 404 and the MLM2 is re-trained. In some embodiments, the step 412 may be optionally omitted, such that if the RMSE1 exceeds the TH1, the MLM2 is invalidated without further attempts to adjust the hyper-parameters of the MLM2, and the method 400 may end. Alternatively to the method ending in this way, the processor may set a flag in memory that the MLM2 was not successfully validated and the method 400 may still proceed to step 414.

At step 414, the processor causes the MLM2 to be applied to a set of feature vectors FV4, to generate simulated data SIMD2. The FV4 may be derived from simulation generation data SGD, which may be a subset of user/activity data stored in the PD2, partitioned for the purpose of generating simulation data.

At step 416, the processor causes the MLM1 to be applied to a set of feature vectors FV5 to generate a second set of predictions PRED. The FV5 may be derived from a second validation data set VD2 that is a subset of PD2.

At step 418, the processor causes the SIMD2 to be compared to the PRED to generate a second RMSE value RMSE2.

At step 420, the processor causes the RMSE2 to be compared to a threshold value TH2. If RMSE2 is less than TH2, the MLM1 may be considered valid for making predictions for the second population, and the method 400 proceeds to step 424. Otherwise, if RMSE2 is greater than $T_2$, the method proceeds to step 422.

At step 422, which may be optional, the processor causes the hyper-parameters of MLM1 to be adjusted. The adjustment of the hyper-parameters of MLM1 may be performed automatically by the processor, or the processor may generate and send a prompt to an authorized user, requesting that the hyper-parameters of MLM1 be adjusted. The method 400 then returns to step 402 and the MLM1 is re-trained. In some embodiments, the step 422 may be optionally omitted, such that if the RMSE2 exceeds the TH2, the MLM1 is invalidated without further attempts to adjust the hyper-parameters of the MLM2, and the method 400 may end.

At step 424, the processor confirms validation of the MLM1 (e.g., in response to determining that the RMSE 2 is less than the TH2, indicating an acceptably low error between the SIMD2 and the PRED). In some embodiments, the processor may confirm validation of the MLM1 by adjusting the value of a corresponding database/data store entry (e.g., of one of the data stores 110 of FIG. 1) to represent that the MLM1 is valid for use in making predictions for the second population.

Examples

While the preceding concepts have been described both generally and in the context of education, other practical example use cases will now be described.

In an example, rather than being applied to, trained to make predictions for, and verified against first and second populations of students in different curriculums, the MLM1 and MLM2 could instead be applied to, trained to make predictions for, and verified against first and second populations of mortgage applicants. In the present example, less information on foreclosure rates may be available for applicants for 15-year term mortgages (i.e., the second population) than for applicants for 30-year term mortgages (i.e., the first population), so it may be difficult to verify whether the MLM1 is valid to predict foreclosure risk of the second population based solely on the foreclosure data available for the second population. The MLM1 may be trained to generate predictions of risk of foreclosure based on historical data (e.g., activity data) associated with the members of the first population. The MLM2 may be trained to generate simulated foreclosure data (e.g., instead of test data) indicating whether or not particular applicants of the second population are foreclosed upon (e.g., within a predefined time period, or over the life of the mortgage), as described generally above. The MLM1's ability to accurately predict foreclosure risk for the second population may be verified against simulated foreclosure data generated by the MLM2, as described generally above.

In an example, rather than being applied to, trained to make predictions for, and verified against first and second populations of students in different curriculums, the MLM1 and MLM2 could instead be applied to, trained to make predictions for, and verified against first and second populations of yogurts. In the present example, less information on foreclosure rates may be available for yogurts made with a newly discovered bacteria XYZ+(i.e., the second population) than for yogurts made with a well-established bacteria XYZ (i.e., the first population), so it may be difficult to verify whether the MLM1 is valid to predict the expected shelf life of the second population of yogurts based solely on the expiration data available for the second population. The MLM1 may be trained to generate predictions of expected yogurt shelf life based on historical data associated with the yogurts of the first population. The MLM2 may be trained to generate simulated expiration data (e.g., instead of test data) representing when certain yogurts of the second population expire, as described generally above. The MLM1's ability to accurately predict expiration dates for the second population of yogurts may be verified against simulated expiration data generated by the MLM2, as described generally above.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
    a feature data store comprising a first memory device configured to store a first set of feature vectors corresponding to a first subset of students of a second population of students having second characteristics and a second set of feature vectors corresponding to a second subset of students of the second population of students;

a model data store comprising a second memory device configured to store a first definition for a first machine learning model and a second definition for a second machine learning model;

a model server coupled to the model data store and the feature data store via an electronic communication network, the model server comprising a third memory device configured to store first computer-readable instructions and a first processor configured to execute the first computer-readable instructions to:

execute the first machine learning model to process the first set of feature vectors to generate a set of risk predictions, wherein the first machine learning model is trained to predict risk for a first population of students having first characteristics; and execute the second machine learning model to process the second set of feature vectors to generate a set of simulated test data, wherein the second machine learning model is trained to simulate test data for the first population of students; and a resource management server comprising a fourth memory device configured to store second computer-readable instructions and a second processor configured to execute the second computer-readable instructions to:

determine, based on the set of simulated test data and the set of risk predictions, that the first machine learning model is valid for predicting risk for the second population of students.

2. The system of claim 1, wherein:

the second set of feature vectors is at least partly derived from a first portion of user data for the second population of students corresponding to a first time period occurring before a variable simulation time;

the second set of feature vectors is at least partly derived from a second portion of the user data for the second population corresponding to a second time period occurring after the variable simulation time; and the first set of feature vectors is derived only from a third portion of the user data corresponding to a third time period occurring before a defined prediction time.

3. The system of claim 2, wherein the defined prediction time occurs before the variable simulation time.

4. The system of claim 3, further comprising an error engine, the error engine comprising circuitry configured to compare the set of simulated test data to the set of risk predictions to generate a root mean square error (RMSE) value.

5. The system of claim 4, further comprising a comparison engine, the comparison engine comprising circuitry configured to compare the RMSE value to a threshold value to generate a result, wherein the second processor is configured to execute the second computer-readable instructions to determine that the first machine learning model is valid for predicting risk for the second population of students based on the result.

6. The system of claim 5, wherein the result represents the RMSE value being less than the threshold value.

7. The system of claim 1, further comprising a training engine, the training engine comprising circuitry configured to:

retrieve a third set of feature vectors from the feature data store, the third set of feature vectors corresponding to a subset of students of the first population of students;

train the first machine learning model based on the third set of feature vectors;

retrieve a fourth set of feature vectors from the feature data store, the fourth set of feature vectors corresponding to the subset of students of the first population of students; and train the second machine learning model based on the fourth set of feature vectors.

8. A method comprising:

retrieving, by a model server from a model data store, a first definition of a first machine learning model that is trained to make risk predictions for a first population of students;

retrieving, by the model server from the model data store, a second definition of a second machine learning model that is trained to simulate test data for the first population of students;

executing, by the model server, the second machine learning model to generate a set of simulated test data for a second population of students;

executing, by the model server, the first machine learning model to generate a set of risk predictions for the second population of students; and validating, by a resource management server, the first machine learning model as being applicable to the second population of students based on the set of simulated test data and the set of risk predictions.

9. The method of claim 8, wherein:

executing the second machine learning model to generate the set of simulated test data for the second population of students comprises processing a second set of feature vectors, wherein the second set of feature vectors is at least partly derived from a first portion of user data for the second population of students corresponding to a first time period occurring before a variable simulation time and at least partially derived from a second portion of the user data for the second population corresponding to a second time period occurring after the variable simulation time; and executing the first machine learning model to generate the set of risk predictions for the second population of student comprises processing a first set of feature vectors, wherein the first set of feature vectors is derived only from a third portion of the user data corresponding to a third time period occurring before a defined prediction time.

10. The method of claim 9, wherein the variable simulation time occurs after the defined prediction time.

11. The method of claim 10, further comprising:

comparing the set of simulated test data to the set of risk predictions to generate a root mean square error (RMSE) value.

12. The method of claim 11, further comprising:

comparing the RMSE value to a threshold value to generate a result, wherein validating the first machine learning model comprises:

validating the first machine learning model as being applicable to the second population of students based on the result.

13. The method of claim 9, further comprising:

retrieving a third set of feature vectors, the third set of feature vectors corresponding to a subset of students of the first population of students;

training the first machine learning model based on the third set of feature vectors;

retrieving a fourth set of feature vectors, the fourth set of feature vectors corresponding to the subset of students of the first population of students; and training the second machine learning model based on the fourth set of feature vectors.

14. A system comprising:
a model server configured to execute first instructions for:
  implementing a first machine learning model to generate a set of risk predictions, wherein the first machine learning model is trained to predict risk for a first population having first characteristics, and wherein the set of risk predictions is generated for a second population having second characteristics; and
  implementing a second machine learning model to generate a set of simulated dependent variable data for the second population, wherein the second machine learning model is trained to simulate test data for the first population; and
a resource management server configured to execute second instructions for:
  determining, based on the set of simulated dependent variable data for the second population and the set of risk predictions for the second population, that the first machine learning model is valid for predicting risk for the second population.

15. The system of claim 14, wherein:
the set of simulated dependent variable data is generated based on a first set of feature vectors;
the set of risk predictions is generated based on a second set of feature vectors;
the first set of feature vectors includes first features derived from first activity data occurring before a variable simulation time and second features derived from second activity data occurring after the variable simulation time; and
the second set of feature vectors includes only third features derived from only third activity data occurring before a defined prediction time.

16. The system of claim 15, wherein the defined prediction time occurs prior to the variable simulation time.

17. The system of claim 16, further comprising an error engine comprising circuitry configured to execute third instructions for comparing the set of simulated dependent variable data to the set of risk predictions to generate a root mean square error (RMSE) value.

18. The system of claim 17, further comprising a comparison engine comprising circuitry configured to execute fourth instructions for comparing the RMSE value to a threshold value to generate a result, wherein the resource management server determines that the first machine learning model is valid for predicting risk for the second population based on the result.

19. The system of claim 18, further comprising a training engine comprising circuitry configured to execute third instructions for:
  retrieving a third set of feature vectors corresponding to a subset of the first population;
  training the first machine learning model based on the third set of feature vectors;
  retrieving a fourth set of feature vectors corresponding to the subset of the first population; and
  training the second machine learning model based on the fourth set of feature vectors.

20. The system of claim 14, wherein:
the first population is a first population of students;
the second population is a second population of students;
the simulated dependent variable data includes simulated test scores; and
the set of risk predictions includes a prediction of risk that a given student will fail to achieve a defined outcome in a course in which the student is enrolled.

* * * * *